United States Patent [19]

Cenker et al.

[11] 4,129,693

[45] Dec. 12, 1978

[54] URETHANE-MODIFIED ISOCYANURATE FOAMS HAVING ENHANCED PHYSICAL PROPERTIES

[75] Inventors: Moses Cenker, Trenton; Peter T. Kan, Plymouth, both of Mich.

[73] Assignee: BASF Wyandotte Corporation, Wyandotte, Mich.

[21] Appl. No.: 752,273

[22] Filed: Dec. 20, 1976

[51] Int. Cl.$^2$ .......................... C08G 18/48; C08K 3/32
[52] U.S. Cl. ..................................... 521/106; 521/116; 521/126; 521/129; 521/174; 521/901; 521/902
[58] Field of Search .................... 260/2.5 AW, 2.5 AJ, 260/2.5 BF

[56] References Cited

U.S. PATENT DOCUMENTS

| 3,134,742 | 5/1954 | Wismer | 260/2.5 J |
| 3,673,128 | 6/1972 | Hayash | 260/2.5 AW |
| 3,681,273 | 8/1972 | Kelly | 260/2.5 J |
| 3,793,236 | 2/1974 | Ashida | 260/2.5 W |
| 3,849,349 | 11/1974 | Frisch | 260/2.5 AW |
| 3,894,972 | 7/1975 | Narayan | 260/2.5 AW |
| 3,909,465 | 9/1975 | Wiedermann | 260/2.5 AW |

FOREIGN PATENT DOCUMENTS 908337 10/1962 United Kingdom ............ 260/2.5 AW

Primary Examiner—C. Warren Ivy
Attorney, Agent, or Firm—Joseph D. Michaels; Bernhard R. Swick; Robert E. Dunn

[57] ABSTRACT

Urethane-modified isocyanurate foams are prepared by catalytically condensing an organic polyisocyanate in the presence of a polyol and from 5% to 50% by weight based on the weight of the organic polyisocyanate of an ammonium phosphate. The resulting foams are characterized by improved flame retardancy and strength properties.

11 Claims, No Drawings

URETHANE-MODIFIED ISOCYANURATE FOAMS HAVING ENHANCED PHYSICAL PROPERTIES

BACKGROUND OF THE INVENTION

1. Field of the Invention

The present invention relates to urethane-modified isocyanurate foams characterized by improved strength properties and flame retardancy. More particularly the invention relates to urethane-modified isocyanurate foams prepared by catalytically condensing an organic polyisocyanate in the presence of a polyol and an inorganic ammonium phosphate.

2. Prior Art

The preparation of isocyanurate foams is well known in the art. Generally, these foams are prepared by catalytically condensing an organic polyisocyanate in the presence of a trimerization catalyst, particularly tertiary amine catalysts. The resulting foams are characterized by low strength properties and excellent flame retardant properties.

The preparation of urethane-modified isocyanurate foams is also well known in the art. These foams are obtained by carrying out the trimerization reaction in the presence of a polyol. The resulting foams have improved strength properties but exhibit a decrease in flame retardancy. This is particularly so when high levels of polyols are employed during the trimerization reaction.

The use of phosphorus-containing compounds to improve the flame-retardant properties of urethane foams is also well known in the art. The most widely known materials so used include elemental phosphorus, tris(2-chloroethyl) phosphate and O,O- diethyl-bis(2-hydroxylethyl)aminomethyl phosphonate. Among the disadvantages associated with use of these materials are (1) low phosphorous content, (2) increase in smoke density, and/or (3) reduction in the strength properties of the resulting foam.

Summary of the Invention

In accordance with the present invention, urethane-modified isocyanurate foams having enhanced physical properties are obtained by catalytically condensing an organic polyisocyanate in the presence of from 10% to 80% by weight of a polyol and from 5% to 50% by weight of an inorganic ammonium phosphate, said weight percent based on the weight of the organic polyisocyanate. The use of the inorganic ammonium phosphates has been found to improve the flame resistance of the urethane-modified isocyanurate foams such that high levels of polyol may be incorporated in the foam to improve the strength properties of the foam without an accompanying decrease in the flame retardant properties.

DESCRIPTION OF THE PREFERRED EMBODIMENTS

The inorganic ammonium phosphates which may be employed in the preparation of the foams of the subject invention may be represented by the following formula:

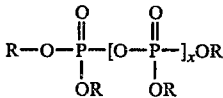

wherein
R is H or $NH_4$ providing that at least one R is $NH_4$, and
x is from 0 to 100.

Representative phosphates include ammonium diacid phosphate, diammonium acid phosphate, ammonium polyphosphates of various molecular weights, ammonium metaphosphate and ammonium pyrophosphate. Generally, the amount of inorganic ammonium phosphate employed in the preparation of the foams of the subject invention will be from 5% to 50% by weight, preferably from 10% to 30% by weight based on the weight of the organic polyisocyanate.

The organic polyisocyanate used in the preparation of the foams of the subject invention corresponds to the formula:

wherein R'' is a polyvalent organic radical which is either aliphatic, aralkyl, alkaryl, aromatic or mixtures thereof, and z is an integer which corresponds to the valence of R'' and is at least two. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4''-triphenylmethane triisocyanate, 2,4,6-toluene triisocyanates; the aromatic tetraisocyanates, such as 4,4'-dimethyldiphenylmethane-2,2'-5,5'-tetraisocyanate, and the like; arylalkyl polyisocyanates, such as xylylene diisocyanate; aliphatic polyisocyanates, such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate.

These polyisocyanates are prepared by conventional methods known in the art such as the phosgenation of the corresponding organic amine.

Still another class of organic polyisocyanates contemplated for use herein are the so-called "quasiprepolymers". These quasi-prepolymers are prepared by reacting an excess of organic polyisocyanate or mixtures thereof with a minor amount of an active hydrogen containing compound as determined by the well-known Zerewitinoff test, as described by Kohler in *Journal Of The American Chemical Society*, 49, 3181 (1927). These compounds and their methods of preparation are well known in the art. The use of any one specific active hydrogen compound is not critical hereto, rather any such compound can be employed herein.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxyl terminated polyesters, polyalkylene ether polyols, hydroxyl-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic, aliphatic and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxyl-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethyl-succinic acid, isophthalic acid, terephthalic acid, hemimellitic acid, and 1,4-cyclohexane-dicarboxylic acid. Any suitable polyhydric alcohol, including both aliphatic and aromatic, may be used such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-terminated polyester with only a portion of the components being a diamine such as ethylenediamine.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxyl-terminated polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable hydroxyl-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including aromatic polyamines such as methylene dianiline, polyaryl-polyalkylene polyamine (crude methylene dianiline), p-aminoaniline, 1,5-diaminonaphthalene, and 2,4-diaminotoluene; aliphatic polyamines such as ethylenediamine, 1,3-propylenediamine; 1,4-butylenediamine, and 1,3-butylenediamine, as well as substituted secondary derivatives thereof.

In addition to the above hydroxyl-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

The reactive polyol medium generally has a molecular weight of at least about 500 and a hydroxyl number ranging from about 30 to about 600. The graft polyol has a molecular weight of at least about 1500 and a viscosity of less than 40,000 cps. at 10% polymer concentration.

A more comprehensive discussion of the graft polyols and their method of preparation can be found in U.S. Pat. Nos. 3,383,351; 3,304,273; 3,652,639, and 3,823,201, the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541; and 3,639,542. As is clear from the above, the particular polyol ingredient employed in the preparation of the quasi-prepolymer is not a critical aspect of the present invention. Any compound containing at least two reactive hydrogen atoms may be so used. Particularly preferred compounds are those having an equivalent weight between 100 and 1500.

As mentioned above, the foams of the subject invention are prepared by condensing an organic polyisocyanate in the presence of a polyol. Any of the organic compounds containing at least two active hydrogen-containing groups reactive with an isocyanate group described above in connection with the preparation of the "quasi-prepolymers" may be employed in the subject invention. Generally, the amount of polyol employed will be from 10% to 80% by weight, preferably from 15% to 70% by weight, based on the weight of the organic polyisocyanate. Thus, the foams of the invention may be prepared employing an NCO/OH ratio of from 3:1 to 100:1, preferably from 4:1 to 25:1.

The catalyst system employed in the present invention comprises a trimerization catalyst and a urethane catalyst. Optionally, a compound which promotes carbodiimide linkages may also be employed. Representative compounds which promote carbodiimide linkages include aliphatic alcohols such as methyl alcohol and furfuryl alcohol; amino alcohols having a molecular weight of from 89 to 304 such as N,N-dialkylaminoalkanols, triethanolamine, N-2-hydroxyethylmorpholine and N,N,N',N'-tetrakis(2-hydroxypropyl) ethylene diamine and s-triazine compounds such as 2,4,6-tris(diethanolamino)-s-triazine, 2,4,6-tris(diisopropanolamino)-s-triazine, 2,4,6-tris(N-methylethanolamino)-s-triazine, and unsymmetrically substituted triazines of the formula:

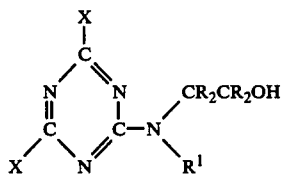

wherein R is hydrogen or lower alkyl of from 1 to 10 carbon atoms, $R^1$ is $CR_2CR_2OH$ or lower alkyl of from 1 to 12 carbon atoms, X is $NR_2$, alkoxy of from 1 to 12 carbon atoms, phenoxy, alkyl of from 1 to 12 carbon atoms, phenyl, hydroxyl, halogen aziridyl, pyrrolidyl, piperidyl, or N-alkylpiperazyl. Since the triazines are unsymmetrically substituted, it is apparent that each X cannot concurrently be

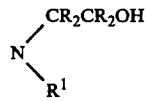

wherein each R and $R^1$ is the same. Generally from about 0.1 part to 10 parts of carbodiimide-promoting compound per 100 parts of organic polyisocyanate will be employed in the subject invention.

Trimerization catalysts which are employed in the present invention include 1,3,5-tris(N,N-dialkylaminoalkyl)-s-hexahydrotriazines; the alkylene oxide and water adducts of 1,3,5-tris(N,N-dialkylaminoalkyl)-s-hexahydrotriazines; 2,4,6-tris(dimethylaminomethyl)phenol; o-, p- or a mixture of o- and p-dimethylaminomethylphenol and triethylene diamine or the alkylene oxide and water adducts thereof, alkali metal carboxylates, alkali metal alkoxides, and organic boron-containing compounds. These compounds are well known in the art, as is their use of catalysts which promote isocyanurate linkages.

1,3,5-Tris(N,N-dialkylaminoalkyl)-s-hexahydrotriazine compounds have heretofore been described as useful isocyanate trimerization catalysts. See U.S. Pat. No. 3,723,366, the disclosure of which is hereby incorporated by reference. Preferred within this group of hexahydrotriazine compounds is 1,3,5,-tris(N,N-dimethylaminopropyl)s-hexahydrotriazine.

The alkylene oxide and water adducts of a 1,3,5-tris(N,N-dialkylaminoalkyl)-s-hexahydrotriazine are presumably quaternary ammonium hydroxides. These compounds are generally prepared by reacting equimolar amounts of the hexahydrotriazine, alkylene oxide and water at a temperature of from about 10° C. to 80° C. for a period of from about five minutes to two hours. Preferred within this group of compounds is the propylene oxide and water adduct of 1,3,5-tris(N,N-dimethylaminopropyl)-s-hexahydrotriazine. See. U.S. Pat. Nos. 3,746,709 and 3,766,103, the disclosures of which are hereby incorporated by reference.

2,4,6-Tris(dimethylaminomethyl)phenol as well as o-, p- and a mixture of o- and p-(dimethylaminomethyl)-phenol are known compounds which are commercially available products sold by Rohm & Haas under the trade names DMP-30 and DMP-10. Triethylenediamine and the alkylene oxide and water adducts thereof are also well known.

The amount of trimerization catalyst which may be employed in the present invention is generally from 0.1 part to 20 parts of catalyst per 100 parts of organic polyisocyanate.

Urethane catalysts which are employed in the present invention are well known in the art and include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylenediamine, triethylamine, diethylcyclohexylamine, dimethylethanolamine, methylmorpholine, trimethylpiperazine, N-ethylmorpholine and diethylethanolamine may also be employed as well as mixtures of any of the above. The preferred urethane-promoting catalyst is dibutyltin diacetate. Generally, the amount of the urethane-promoting catalyst employed will be from 0.01% to 10% by weight based on the weight of organic polyisocyanate.

The foams of the present invention are prepared by mixing together the organic polyisocyanate, the polyols, or the quasi-prepolymer and the catalysts at an initiating temperature which, depending on the catalyst, will range from about 0° C. to 50° C. Under such conditions almost immediately an exotherm is developed within the reaction system, carbon dioxide is generated and foam formation begins. Alternatively, the foams may be prepared by adding the polyols and the catalysts to the mixture of polyisocyanate and an auxiliary blowing agent, preferably a halohydrocarbon.

The present invention also contemplates the incorporation of additional ingredients in the foam formulation to tailor the properties thereof. Thus, plasticizers, surfactants, such as the silicone surfactants, e.g., alkylpolysiloxanes may be employed in the invention. Further additional ingredients include auxiliary or supplemental blowing agents, such as water or halohydrocarbons. Also, inorganic fillers, pigments and the like can be used.

In any event, the foams prepared in accordance herewith are rigid cellular products having a density of from about one pound to forty pounds per cubic foot which exhibit excellent strength and flame properties, such as fire resistance, low smoke evolution and excellent weight retention.

Following are specific, non-limiting examples which are provided to illustrate the enumerated principles described herein. All parts are by weight unless otherwise indicated. In the examples, the compressive strength properties of the foams were determined in accordance with ASTM-1621, the flame retardant properties by ASTM D-3014 and the friability properties by ASTM C-421. In the examples which follow, the following abbreviations are employed:

TDI — a mixture of 80/20 by weight 2,4-, 2,6-tolylene diisocyanate
PAPI — polymethylene polyphenyl isocyanate
TDH — 1,3,5-tris(N,N-dimethylamino-propyl) hexahydrotriazine
DBTDA — dibutyltin diacetate
DMT — 2,4-bis(diethylamino)-6-N-methylethanolamino-s-triazine
FA — furfuryl alcohol
DC-193 — polyalkyl siloxane-polyoxyalkylene copolymer, a foam stabilizer
F-11B — trichlorofluoromethane
Polyol A — A polyol prepared by the reaction of ethylene oxide with trimethylolpropane, said polyol having an equivalent weight of 250.
Polyol B — A polyol prepared by the reaction of ethylene oxide with ethylene glycol, said polyol having an equivalent weight of 100.
Polyol C — A polyol prepared by the reaction of ethylene oxide with ethylene glycol, said polyol having an equivalent weight of 150.
Polyol D — A polyol prepared by the reaction of ethylene oxide with ethylene glycol, said polyol having an equivalent weight of 200.
Polyol E — A polyol prepared by the reaction of ethylene oxide with ethylene glycol, said polyol having an equivalent weight of 300.
Polyol F — A polyol prepared by the reaction of ethylene oxide with trimethylolpropane, said polyol having an equivalent weight of 500.
Polyol G — A polyol prepared by the reaction of ethylene oxide with trimethylolpropane, said polyol having an equivalent weight of 100.

EXAMPLES 1–12

A series of foams was prepared by simultaneously adding an inorganic ammonium phosphate and catalysts to a reaction vessel equipped with a high speed stirrer to which had been charged a quasi-prepolymer prepared by reacting a mixture of TDI and PAPI with a designated polyol. An exotherm was generated and foam formation followed soon after. In Examples 1–6, 0.1 part of DBTDA, 3 parts of DMT and 8 parts of TDH were employed. In Examples 7–12, 0.1 part of DBTDA, 3 parts of FA and 8 parts of TDH were employed. Table I, below, lists the foams prepared as well as the physical properties of the resulting foams. As the data in the Table clearly illustrate, the use of diammonium acid phosphate in the preparation of foams resulted in foams of improved physical properties without loss in flame retardancy.

TABLE I

| | Parts by Weight | | | | | Physical Properties | | | Butler Chimney Test | |
|---|---|---|---|---|---|---|---|---|---|---|
| Example | TDI | PAPI | Polyol F | Red P | $(NH_4)_2 HPO_4$ | Comp. Str., 10% Defl., psi. | Tumb. Friab., % Wt. Loss | NBS Smoke Den. | Wt. Ret., % | Flame Ht., in. |
| | 22.6 | 77.4 | 50 | — | — | 18 | 4 | 100 | 62 | 10 |
| 2 | 22.6 | 77.4 | 50 | 5 | — | 19 | 10 | 189 | 90 | 7 |
| 3 | 22.6 | 77.4 | 50 | — | 20 | 28 | 6 | 137 | 84 | 7 |
| 4 | 13.5 | 86.5 | 30 | — | — | 28 | 16 | 141 | 76 | 10 |
| 5 | 13.5 | 86.5 | 30 | 5 | — | 23 | 14 | 206 | 88 | 5 |
| 6 | 13.5 | 86.5 | 30 | — | 20 | 33 | 16 | 125 | 91 | 6 |
| 7 | 22.6 | 77.4 | 50 | — | — | 16 | 5 | 78 | 37 | 10 |
| 8 | 22.6 | 77.4 | 50 | 5 | — | 20 | 8 | 195 | 90 | 6 |
| 9 | 22.6 | 77.4 | 50 | — | 20 | 22 | 9 | 133 | 90 | 6 |
| 10 | 13.5 | 86.5 | 30 | — | — | 27 | 11 | 147 | 81 | 10 |
| 11 | 13.5 | 86.5 | 30 | 5 | — | 22 | 18 | 148 | 89 | 5 |
| 12 | 13.5 | 86.5 | 30 | — | 20 | 35 | 15 | 111 | 91 | 5 |

EXAMPLES 13–18

A series of foams was prepared employing as the organic polyisocyanate reactant quasi-prepolymers of mixtures of TDI and PAPI and Polyol F in varying amounts. In addition to the ingredients set forth in Table II, each formulation included 0.1 parts of DBTDA, 8 parts of TDH, 1 part of DC-193 and 20 parts of diammonium acid phosphate. The other ingredients employed, amounts thereof, and the physical properties of the resulting foams are presented in Table II, below.

TABLE II

| | Parts by Weight | | | | | | | Physical Properties | | | Butler Chimney Test | |
|---|---|---|---|---|---|---|---|---|---|---|---|---|
| Example | TDI | PAPI | Polyol F | DMT | FA | F-11B | Den., pcf. | Comp. Str., 10% Defl., psi. | Tumb. Friab., % Wt. Loss | NBS Smoke Den. | Wt. Ret., % | Flame Ht., in. |
| 13 | 22.6 | 77.4 | 50 | 3 | — | 27 | 2.5 | 28 | 6 | 137 | 84 | 7 |
| 14 | 18.1 | 81.9 | 40 | 3 | — | 22 | 2.4 | 20 | 15 | — | 90 | 5 |
| 15 | 13.5 | 86.5 | 30 | 3 | — | 20 | 2.5 | 33 | 16 | 125 | 91 | 6 |
| 16 | 31.6 | 68.4 | 70 | — | 3 | 33 | 2.0 | 15 | 7 | — | 86 | 9 |

TABLE II-continued

| | Parts by Weight | | | | | | Physical Properties | | | | |
|---|---|---|---|---|---|---|---|---|---|---|---|
| | | | Polyol | | | F- | Den., | Comp. Str., 10% Defl., psi. | Tumb. Friab., % Wt. Loss | NBS Smoke Den. | Butler Chimney Test | |
| Example | TDI | PAPI | F | DMT | FA | 11B | pcf. | | | | Wt. Ret. % | Flame Ht., in. |
| 17 | 27.1 | 72.9 | 60 | — | 3 | 30 | 2.1 | 17 | 6 | — | 85 | 8 |
| 18 | 22.6 | 77.4 | 50 | — | 3 | 27 | 2.2 | 22 | 9 | 133 | 90 | 6 |

EXAMPLES 19-35

A series of foams was prepared employing as the organic polyisocyanate reactant quasi-prepolymers of mixtures of TDI and PAPI and various polyols in varying amounts. In addition to the ingredients set forth in Table III, each formulation included 2 parts of FA, 1 part of DC-193, and 20 parts of diammonium acid phosphate. The other ingredients employed, amounts thereof, and the physical properties of the resulting foams are presented in Table III, below.

TABLE III

| | Parts by Weight | | | | | | | Physical Properties | | | |
|---|---|---|---|---|---|---|---|---|---|---|---|
| Example | TDI | PAPI | Polyol | DBTDA | TDH | F-11B | Den., pcf. | Comp. Str., 10% Defl., psi. | Tumb. Friab., % Wt. Loss | Butler Chimney Test Wt. Ret. % | Flame Ht., in. |
| 19 | 12.6 | 87.4 | A15 | 0.2 | 3 | 24 | 2.0 | 17 | 43 | 93 | 4 |
| 20 | 14.3 | 85.7 | A17 | 0.1 | 4 | 24 | 2.0 | 17 | 30 | 93 | 4 |
| 21 | 16.8 | 83.2 | A20 | 0.1 | 3 | 26 | 1.9 | 13 | 27 | 92 | 4 |
| 22 | 20.2 | 79.8 | A24 | 0.1 | 3 | 26 | 2.0 | 17 | 18 | 91 | 4 |
| 23 | 25.2 | 74.8 | A30 | 0.1 | 3 | 28 | 1.9 | 12 | 18 | 89 | 5 |
| 24 | 26.1 | 73.9 | B15 | 0.3 | 3 | 26 | 2.0 | 14 | 18 | 91 | 5 |
| 25 | 34.8 | 65.2 | B20 | 0.3 | 4 | 28 | 2.0 | 16 | 12 | 87 | 7 |
| 26 | 43.5 | 56.5 | B25 | 0.3 | 5 | 34 | 2.0 | 13 | 7 | 84 | 8 |
| 27 | 17.4 | 82.6 | C15 | 0.2 | 3 | 26 | 1.8 | 11 | 41 | 91 | 5 |
| 28 | 23.2 | 76.8 | C20 | 0.2 | 3 | 30 | 1.8 | 12 | 14 | 87 | 6 |
| 29 | 29.0 | 71.0 | C25 | 0.2 | 3 | 30 | 1.8 | 12 | 14 | 87 | 7 |
| 30 | 13.1 | 86.9 | D15 | 0.2 | 3 | 24 | 2.0 | 14 | 22 | 90 | 4 |
| 31 | 17.4 | 82.6 | D20 | 0.1 | 3 | 26 | 2.0 | 13 | 23 | 89 | 5 |
| 32 | 21.8 | 78.2 | D25 | 0.1 | 3 | 28 | 1.9 | 12 | 11 | 88 | 6 |
| 33 | 8.7 | 91.3 | E15 | 0.1 | 3 | 24 | 1.9 | 13 | 38 | 91 | 4 |
| 34 | 11.6 | 88.4 | E20 | 0.1 | 3 | 24 | 2.0 | 15 | 32 | 92 | 4 |
| 35 | 14.5 | 85.5 | E25 | 0.1 | 3 | 24 | 2.2 | 15 | 26 | 95 | 4 |

EXAMPLES 36-39

A series of foams was prepared by simultaneously adding a polyol, an inorganic ammonium phosphate and catalysts to a reaction vessel equipped with a high speed stirrer to which had been charged a polyisocyanate. An exotherm was generated and foam formation followed soon after. In addition to the ingredients set forth in Table IV, each formulation included 1 part of DC-193, from 16 to 24 parts of F-11B and 18.5 parts of ammonium diacid phosphate. The other ingredients employed amounts thereof and the flame retardant properties of the resulting foams are presented in Table IV, below.

TABLE IV

| | | | Parts by Weight | | | | | | Physical Properties | | |
|---|---|---|---|---|---|---|---|---|---|---|---|
| | | | Polyol | | | | | | | Butler Chimney Test | |
| Example | TDI | PAPI | G | F | DBTDA | FA | TDH | Den., pcf. | NBS Smoke Den. | Wt. Ret., % | Flame Ht., in. |
| 36 | 8.7 | 91.3 | 5 | — | 0.3 | 2 | 3 | 1.8 | 135 | 95 | 5 |
| 37 | 16.4 | 83.6 | 5 | 20 | 0.3 | 2 | 3 | 1.8 | 76 | 93 | 5 |
| 38 | 13.5 | 86.5 | — | 30 | 0.1 | 3 | 8 | 2.3 | 172 | 94 | 6 |
| 39 | 22.6 | 77.4 | — | 50 | 0.1 | 3 | 8 | 2.2 | 131 | 91 | 7 |

EXAMPLES 40-47

A series of foams was prepared employing as the organic polyisocyanate reactant quasi-prepolymers of TDI and PAPI and various polyols in varying amounts. In addition to the ingredients set forth in Table V, each formulation included 0.3 part of DBTDA, 3 parts of TDH, 1 part of DC-193 and from 16 to 22 parts of F-11B. The ammonium polyphosphate employed is commercially available under the tradename PHOS-CHECK P30 (32% P). The other ingredients employed, amounts thereof, and flame retardant properties of the resulting foams are presented in Table V, below.

TABLE V

| | | | Parts by Weight | | | | | | | Physical Properties | | |
|---|---|---|---|---|---|---|---|---|---|---|---|---|
| | | | Polyol | | | | Red | Ammonium Poly- | Den., | NBS Smoke | Butler Chimney Test | |
| Example | TDI | PAPI | G | F | DMT | FA | P | Phosphate | pcf. | Den. | Wt. Ret. % | Flame Ht., in. |
| 40 | 8.7 | 91.3 | 5 | — | 2 | — | 5 | — | 2.1 | 123 | 94 | 5 |

TABLE V-continued

| | | | Parts by Weight | | | | | | | Physical Properties | | |
| | | | | | | | | | | | | Butler Chimney Test |
| | | | Polyol | | | | Red | Ammonium Poly- | Den., | NBS Smoke | Wt. Ret. | Flame Ht., |
| Example | TDI | PAPI | G | F | DMT | FA | P | Phosphate | pcf. | Den. | % | in. |
|---|---|---|---|---|---|---|---|---|---|---|---|---|
| 41 | 8.7 | 91.3 | 5 | — | 2 | — | — | 16.7 | 2.2 | 85 | 94 | 5 |
| 42 | 16.4 | 83.6 | 5 | 20 | 2 | — | 5 | — | 2.3 | 150 | 91 | 6 |
| 43 | 16.4 | 83.6 | 5 | 20 | 2 | — | 5 | 16.7 | 2.1 | 79 | 92 | 6 |
| 44 | 8.7 | 91.3 | 5 | — | — | 2 | 5 | — | 2.3 | 127 | 95 | 5 |
| 45 | 8.7 | 91.3 | 5 | — | — | 2 | — | 16.7 | 2.1 | 100 | 93 | 5 |
| 46 | 16.4 | 83.6 | 5 | 20 | — | 2 | 5 | — | 2.2 | 145 | 94 | 5 |
| 47 | 16.4 | 83.6 | 5 | 20 | — | 2 | — | 16.7 | 2.2 | 106 | 92 | 6 |

The embodiments of the invention in which an exclusive property or privilege is claimed are defined as follows:

1. In a foam characterized by urethane, isocyanurate and carbodiimide linkages prepared in the presence of
   a. a halohydrocarbon blowing agent, and
   b. a catalytically sufficient amount of a catalyst system comprising compounds which promote the urethane, isocyanurate and carbodiimide reactions by condensing an organic polyisocyanate with an ethylene oxide adduct of a polyhydric alcohol having an equivalent weight of from 100 to 500 and an ethylene oxide content of from 50 percent to 90 percent by weight employing an NCO/OH ratio of from 3:1 to 100:1, the improvement which comprises conducting the condensation reaction in the presence of from 5 percent to 50 percent by weight based on the weight of the organic polyisocyanate of an inorganic ammonium phosphate having the formula:

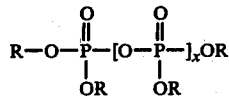

wherein
R is H or $NH_4$ providing that at least one R is $NH_4$, and
x is from 0 to 100.

2. The foam of claim 1 wherein the inorganic ammonium phosphate is diammonium acid phosphate.
3. The foam of claim 1 wherein the inorganic ammonium phosphate is ammonium diacid phosphate.
4. The foam of claim 1 wherein the inorganic ammonium phosphate is ammonium polyphosphate.
5. The foam of claim 1 wherein the polyhydric alcohol is ethylene glycol.
6. The foam of claim 1 wherein the polyhydric alcohol is trimethylolpropane.
7. The foam of claim 1 wherein the compound which promotes the carbodiimide reaction is furfuryl alcohol.
8. The foam of claim 1 wherein the compound which promotes the carbodiimide reaction is 2,4-bis-(diethylamino)-6-N-methylethanolamino-s-triazine.
9. The foam of claim 1 prepared in the presence of a tertiary amine trimerization catalyst.
10. The foam of claim 1 wherein the catalyst is 1,3,5-tris(N,N-dimethylaminopropyl)hexahydrotriazine.
11. The foam of claim 1 prepared in the presence of dibutyltin diacetate.

* * * * *